United States Patent
Geoffroy et al.

(10) Patent No.: US 8,380,369 B2
(45) Date of Patent: Feb. 19, 2013

(54) RELATIVE SPEED GAUGE INTENDED FOR THE MONITORING OF A PILOTLESS AIRCRAFT

(75) Inventors: Rémi Geoffroy, Saint Medard en Jalles (FR); Yannick Thiry, Biganos (FR); Patrick Cazaux, Le Pian Medoc (FR)

(73) Assignee: Thales, Neuilly sur Seine (FR)

( * ) Notice: Subject to any disclaimer, the term of this patent is extended or adjusted under 35 U.S.C. 154(b) by 364 days.

(21) Appl. No.: 12/914,719

(22) Filed: Oct. 28, 2010

(65) Prior Publication Data

US 2011/0106344 A1 May 5, 2011

(30) Foreign Application Priority Data

Nov. 3, 2009 (FR) ...................................... 09 05264

(51) Int. Cl.
*G05D 3/12* (2006.01)
*G06F 19/00* (2006.01)
(52) U.S. Cl. .................... 701/4; 701/9; 701/16; 340/945
(58) Field of Classification Search .................. 701/4, 6, 701/14, 16; 340/945
See application file for complete search history.

(56) References Cited

U.S. PATENT DOCUMENTS

| 6,584,382 | B2 | 6/2003 | Karem |
| 2007/0021878 | A1 | 1/2007 | Builta et al. |
| 2008/0071431 | A1 | 3/2008 | Dockter et al. |
| 2009/0171519 | A1* | 7/2009 | Closse et al. .................... 701/16 |
| 2011/0121997 | A1* | 5/2011 | Paines ........................... 340/945 |
| 2012/0158221 | A1* | 6/2012 | Al Fadhli ....................... 701/16 |

* cited by examiner

*Primary Examiner* — Tan Q Nguyen
(74) *Attorney, Agent, or Firm* — Baker Hostetler LLP

(57) ABSTRACT

The device for checking speed intended for an aircraft ready to land on deck on a moving vehicle, the aircraft having a current vertical speed, called the first speed, and a threshold value of vertical downward speed relating to the vertical speed of the moving vehicle, called the "low threshold", the ship having an absolute vertical speed, called the second speed, comprises a display and means for receiving data originating from the aircraft, notably its vertical absolute speed. The device includes a calculator making it possible to generate on the display a graduated speed gauge including a fixed cursor indicating the first vertical speed and a second moving cursor indicating the speed of the ship, a third moving cursor indicating the low threshold, the graduation being centered around the value of the first vertical speed.

11 Claims, 6 Drawing Sheets

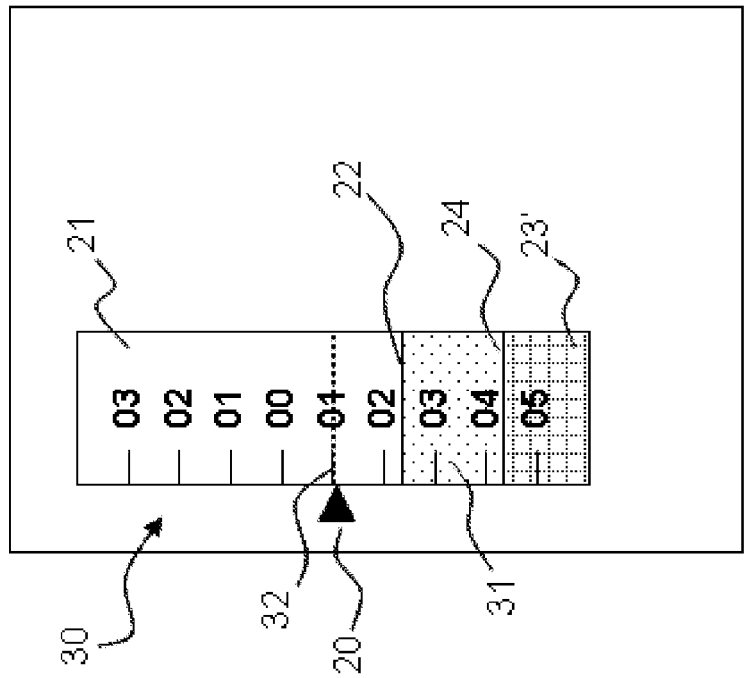
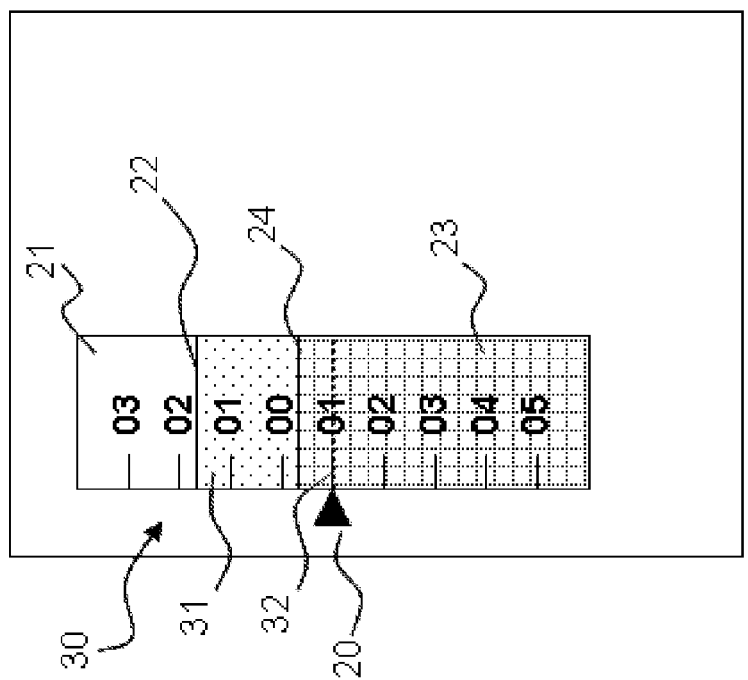
FIG.3C
FIG.3D

RELATIVE SPEED GAUGE INTENDED FOR THE MONITORING OF A PILOTLESS AIRCRAFT

CROSS-REFERENCE TO RELATED APPLICATION

This application claims priority to foreign French patent application No. FR 0905264, filed on Nov. 3, 2009, the disclosure of which is incorporated by reference in its entirety.

FIELD OF THE INVENTION

The present invention relates to the field of devices for generating data displayed in a display intended for controlling and monitoring the manoeuvres of an aircraft when landing. More particularly, the devices of the invention relate to the monitoring and control of pilotless aircraft manoeuvring in phases of landing on a deck of a moving platform such as a ship.

BACKGROUND

Generally, pilotless aircraft control and monitoring missions may be of various kinds. Notably, they may relate to the monitoring of the takeoff or landing phases or else the monitoring of the proper following of the flight plan during the navigation of such an aircraft.

An operator usually has a display system at his disposal, allowing him to monitor the behaviour of the aircraft and to take decisions, for example a mission cancellation decision, if need be.

In the course of the takeoff or landing phases, the operator must be reactive. In the event of incidents, the mission must be rapidly interrupted so as to provide for the safety, firstly, of the onboard personnel in proximity to the landing zone and secondly, of the apparatus itself.

When the landing or takeoff zone is moving, a drawback resides in the difficulty of controlling the manoeuvres of a remotely controlled aircraft while guaranteeing maximum safety in the vicinity.

Typically, when the landing takes place on a ship, the swell, the wind and the relative vertical motions of the aircraft and of the ship may comprise risks in the execution of the manoeuvres.

The vertical speed of the aircraft, during a deck landing for example, must always be compared and measured in relation to the vertical speed of the ship.

A current solution consists in displaying the two items of information previously introduced: the absolute vertical speed of the aircraft and the absolute vertical speed of the ship in two distinct indicators.

An embodiment of the prior art proposes two graduated displays which represent vertical speed gauges, respectively for an aircraft and for a ship.

FIG. 1 represents such gauges which allow an operator to monitor the landing of an aircraft on the deck of the ship.

A first gauge makes it possible to indicate the vertical speed V1 of the aircraft during a deck-landing phase or deck-landing preparation phase. A second gauge makes it possible to indicate the vertical speed V2 of the ship.

The speeds of the aircraft and of the ship are represented in two indicators, formed by the gauges, independently of one another. This solution allows an operator to follow the variations of the various speeds. However this solution possesses drawbacks.

First of all, the items of information are represented in different indicators, they are therefore difficult to monitor simultaneously.

Thereafter this solution proposes only independent monitoring of the two speeds. It does not allow the operator to appraise the impacts of the dynamics of the ship on the aircraft, especially at the time of the deck-landing when the aircraft is approaching the deck where the least error can constitute an imminent danger. The two indicators become a drawback in respect of monitoring since the operator's attention must be focused on two gauges.

Indeed, during the takeoff and deck-landing phases, the aircraft's movements do not take place within a fixed reference frame but within a moving reference frame. The combination of the two speeds therefore influences the decision that must be taken by the operator. This dependency is not currently represented. This may therefore result in the operator taking a decision too late.

SUMMARY OF THE INVENTION

The invention alleviates the aforementioned drawbacks.

The invention makes it possible to ensure the monitoring of the deck-landing or landing manoeuvres when items of information originate from two moving systems such as an aircraft and a ship whose dynamics are different.

The invention makes it possible to generate indicators allowing representation of the absolute vertical speeds of the aircraft and of the ship ensuring a unique monitoring point. The invention makes it possible to monitor a criterion generated so as to rapidly and flawlessly detect a speed value that could threaten the mission.

Advantageously, the device for checking speed intended for an aircraft ready to land on deck on a moving vehicle, the aircraft having a current vertical speed, called the first speed, the moving vehicle having a vertical speed, called the second speed, a first setpoint being defined, the said setpoint corresponding to the desired limit of vertical downward speed of the aircraft in relation to the vertical speed of the moving vehicle, comprises a display and means for receiving data originating from the aircraft, notably its vertical absolute speed.

Advantageously, the device comprises a calculator making it possible to generate on the display a graduated speed gauge comprising a first fixed cursor indicating the value of the first speed and a second moving cursor indicating the value of the second speed, a third moving cursor indicating the first setpoint, the graduation being centred around the value of the first vertical speed.

Advantageously, a first zone lying between the second and the third cursor comprises a first noteworthy graphical element allowing an operator to check that the first speed is not situated below the said zone.

Advantageously, the first graphical element is a colour.

Advantageously, a second zone situated below the third cursor comprises a second noteworthy graphical element.

Advantageously, the second graphical element is a different colour from the first graphical element.

Advantageously, a predefined high threshold is generated in the form of a fourth cursor in the gauge corresponding to a maximum limit speed of the aircraft.

Advantageously, a predefined low threshold is generated in the form of a fifth cursor in the gauge corresponding to a minimum limit speed of the aircraft.

Advantageously, a zone is situated beyond the fourth or the fifth cursor and it comprises a third noteworthy graphical element indicating a danger zone.

Advantageously, the third graphical element is a colour.

BRIEF DESCRIPTION OF THE DRAWINGS

Other characteristics and advantages of the invention will become apparent with the aid of the description which follows, given in conjunction with the appended drawings which represent:

FIG. 3A, 3B, 3C, 3D: four configurations of an indicator of the relative speed of the invention between an aircraft and a ship in a second typical case;

DETAILED DESCRIPTION

Figure 1:
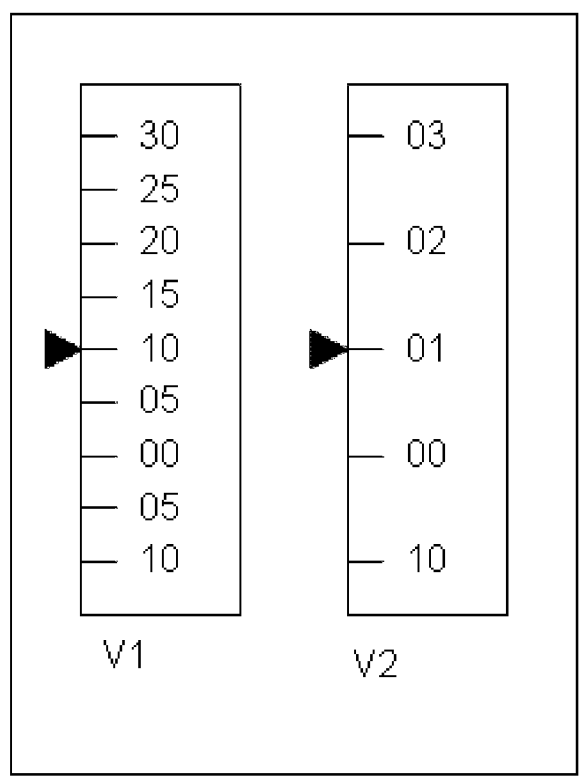
FIG. 1: two speed indicators of the prior art.
Figure 2:
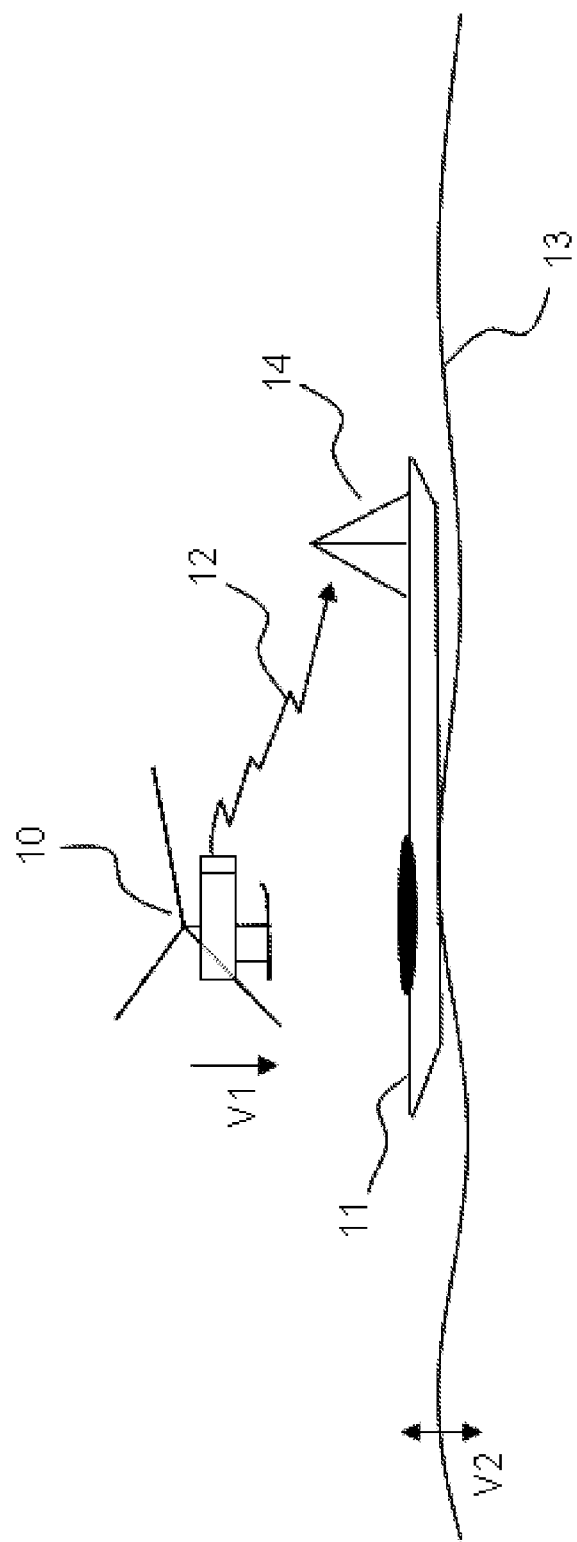
FIG. 2: an indicator of the relative speed of the invention between an aircraft and a ship in a first typical case.

FIG. 2 represents a configuration in which the invention applies. It involves a typical case where an aircraft 10 is in position ready to land on the deck of a ship 11. The control tower 14 receives information originating from the aircraft 10, notably as to its speed V1. The operator must be able to check throughout the descent of the aircraft 10 that its vertical speed V1 with respect to the ship's vertical speed V2 caused notably by the swell 13 remains within a certain limit.

The discrepancy between the vertical speed of the aircraft and that of the ship must adhere to a certain limit beyond which the risks of a violent landing may cause damage or be detrimental to the safety of the ship's crew.

The invention makes it possible to check in one and the same indicator that the relative speed of V1 with respect to the speed V2 remains within a certain predefined limit.

FIG. 3 represents an indicator 30 representing a graduated gauge whose graduations represent speed units. The invention makes it possible to generate on one and the same indicator 30 the values of the two vertical speeds, respectively of the ship and of the aircraft, so as to provide for the checking of the vertical relative speed of the aircraft with respect to that of the ship.

The vertical speed of the aircraft is represented by the cursor 32, the absolute vertical speed of the ship is represented by the cursor 22.

The cursor 24 represents a first predefined setpoint representing the desired limit of the vertical speed of the aircraft in relation to the vertical speed of the ship. This entails a cursor representing a relative datum.

It is important that the aircraft does not possess too great a descent speed while the ship has an upward speed caused by the swell. A risk of violent landing could then arise.

An advantage of the invention is that the cursor representing the vertical speed of the aircraft is fixed in the indicator 30. Depending on the relative speed of the aircraft with respect to that of the ship, the zone 31 may then move towards the zone 21 or towards the zone 23.

In a particular embodiment, the indicator 30 can represent a delimitation such as the cursor 24 and below which a danger zone is visually noteworthy.

Figure 3A:
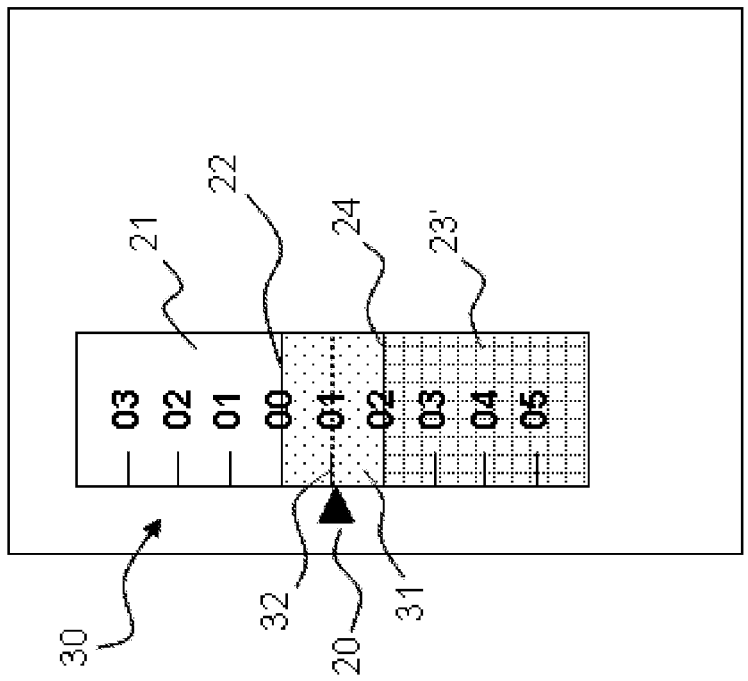
Figure 3B:
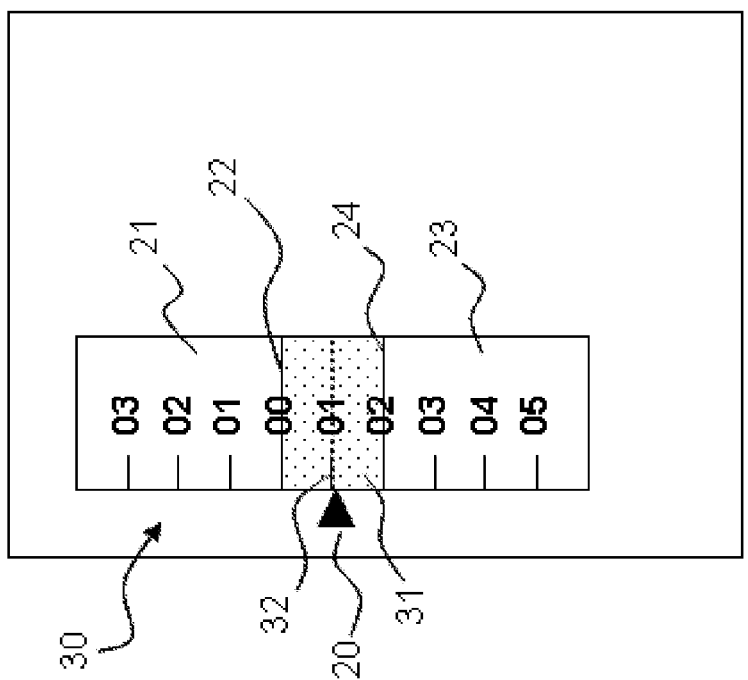

FIG. 3B illustrates this embodiment. The zone 23' which is situated below the cursor 24 can comprise a colour code or a representation which allows the operator to rapidly pinpoint the danger zone.

An advantage for the operator is to be able to have at his disposal a single indicator 30, thereby making it possible to be reactive regarding the changes in the relative speed. The invention therefore allows an operator to detect rapidly and without error an excessive value of the relative vertical speed of the aircraft 10 in the moving reference frame tied to the ship 11.

FIGS. 3A and 3B make it possible to represent the indicator 30 making it possible to read the absolute vertical speed of the aircraft by way of the cursor 32. In one embodiment, a symbol 20 can comprise a triangle pointing at the ordinate corresponding to the vertical speed of the aircraft. This triangle is therefore fixed in the indicator 30.

An advantage of the invention is that the set of graduations represent a moving scale, which scrolls according to the speed of the aircraft.

In this case, inside the indicator 30 is a moving scale whose graduations are the possible speed values. This scale translates vertically. The value of the vertical speed of the aircraft is indicated by the symbol 20 which is aligned with the cursor 32.

In the example of FIG. 3A, the absolute vertical speed of the aircraft is 1 m/s downwards, the vertical speed of the ship is 0 m/s and the first setpoint is 2 m/s downwards.

FIG. 3C represents the indicator 30 while the aircraft has a vertical speed of 1 m/s downwards. On the other hand, the ship has a vertical speed of between 1 and 2 m/s upwards, its speed being represented by the cursor 22.

It is realized straight away by reading the information of the indicator 30 that the cursor 32 representing the vertical speed of the aircraft is in the danger zone 23.

The operator can then undertake corrective measures very rapidly as soon as he observes such a situation.

FIG. 3D represents the indicator 30 while the aircraft has a vertical speed of 1 m/s downwards. On the other hand, the ship has a vertical speed of between 2 and 3 m/s downwards, its speed being represented by the cursor 22.

It is realized straight away that the cursor 32 representing the vertical speed of the aircraft is beyond the danger zone 23, the operator can for example undertake manipulations aimed at restoring the position of the cursor 20 below the vertical speed of the ship so as to land the aircraft on the deck of the ship.

In the embodiments of FIGS. 3A, 3B, 3C and 3D, the discrepancy is constant between the absolute speed of the ship represented by the cursor 22 and the first setpoint represented by the cursor 24. In the examples of FIGS. 3A, 3B, 3C and 3D, this discrepancy is 2 m/s.

The invention makes it possible to configure this discrepancy as a function of the missions and contexts of flight. This discrepancy represents, in FIGS. 3A, 3B, C and 3D, a zone 31 corresponding to an authorized range of speeds for the aircraft while the zone 23, 23' represents an a priori prohibited range of speeds of the aircraft.

When the aircraft has a speed beyond the cursor 22, it is not in a danger configuration. On the other hand, it is not in a commenced phase of the landing. This range can correspond to a landing preparation phase.

This representation makes it possible to present in a permanent manner the vertical speed of the aircraft 32, centred and fixed in the indicator 30. The speed ranges representing a danger or the authorized speed ranges shift vertically in the indicator 30. The vertical shift of the graduation and therefore of the speed ranges previously mentioned is dependent on the absolute speeds of the ship and of the aircraft.

The invention makes it possible to represent in an intuitive manner the entry of the absolute vertical speed of the aircraft into the non-authorized speed range. For this purpose, it suffices that the aircraft's absolute speed cursor lies in an unauthorized zone whose colour code may be noteworthy. An alarm is then raised.

The various configurations represented in FIGS. 3A, 3B, 3C and 3D are summarized.

The configuration of FIG. 3A is:
Absolute vertical speed of the aircraft: 1 m/s downwards
Absolute vertical speed of the ship: 0 m/s
The limit acceptable relative vertical speed of the aircraft in the ship moving reference frame: 2 m/s downwards
No speed alarm is triggered The configuration of FIG. 3B is:
Absolute vertical speed of the aircraft: 1 m/s downwards
Absolute vertical speed of the ship: 0 m/s
The limit acceptable relative vertical speed of the aircraft in the ship moving reference frame: 2 m/s downwards
No speed alarm is triggered The configuration of FIG. 3C is:
Absolute vertical speed of the aircraft: 1 m/s downwards
Absolute vertical speed of the ship: 1.7 m/s upwards
The limit acceptable relative vertical speed of the aircraft in the ship moving reference frame: 0.3 m/s downwards
A speed alarm is triggered The configuration of FIG. 3D is:
Absolute vertical speed of the aircraft: 1 m/s downwards
Absolute vertical speed of the ship: 2.3 m/s downwards
The limit acceptable relative vertical speed of the aircraft in the ship moving reference frame: 4.3 m/s downwards
No speed alarm is triggered Just like for numerous flight parameters, the vertical speed of the aircraft is limited to a domain of predefined acceptable speeds.

Figure 4A:
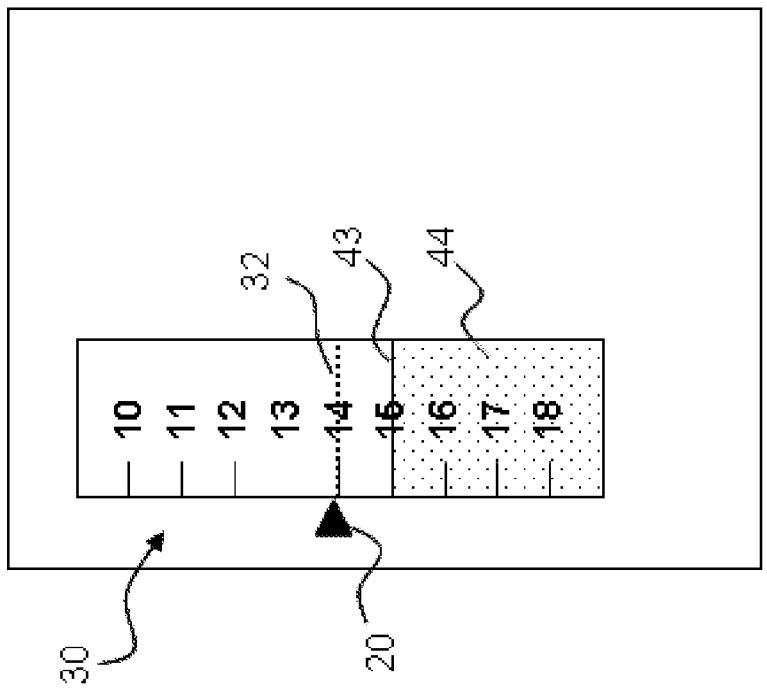
FIG. 4A, 4B, 4C, 4D: four configurations of an indicator of the relative speed of the invention between an aircraft and a ship in a third typical case.

FIG. 4A represents a typical case where the speed of the aircraft is close to the acceptable maximum limit represented by a cursor 41.

The moving cursor 41 symbolizes the aircraft's maximum limit of absolute vertical speed desired. Beyond the cursor 41, the speed range defines a zone 42 in which the aircraft incurs a risk.

Figure 4B:
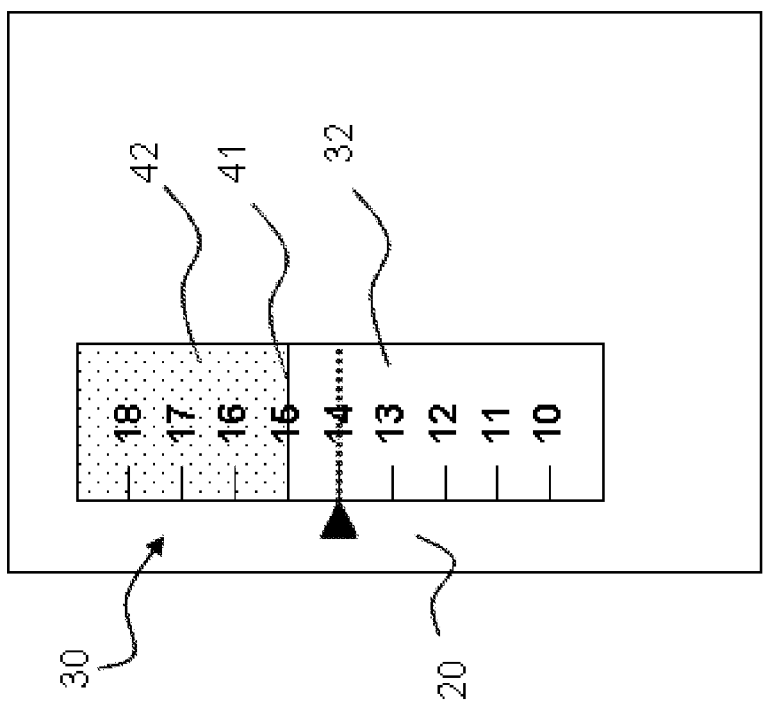

FIG. 4B represents a typical case where the speed of the aircraft is close to the acceptable minimum limit represented by a cursor 43.

The moving cursor 43 symbolizes the aircraft's minimum limit of absolute vertical speed desired. Below the cursor 43, the speed range defines a zone 44 in which the aircraft incurs a risk.

The dynamics of the reference frame tied to the ship within which the aircraft is travelling may be represented by the indicator 30. The cursors 41 and 43 indicate the thresholds of acceptable speed of the absolute speed of the aircraft upwards and downwards referred to the moving reference frame tied to the ship.

In the example of FIG. 4A, the aircraft's acceptable upward vertical speed threshold indicates the speed of 15 m/s upwards. And in the example of FIG. 4B, the aircraft's acceptable downward vertical speed threshold indicates the speed of 15 m/s downwards.

FIGS. 3A, 3B, 3C and 3D do not represent the maximum and minimum limit values since the aircraft's absolute speed is not close to these limits.

The generation of these thresholds 41 and 43 in the indicator 30 may be combined with an alarm device. The alarm device may be integrated into the indicator by way of a colour code making it possible to differentiate the acceptable zone from the vertical speed zones which are unacceptable for the aircraft.

At any instant the speed cursor must be inside the zone defined by the two thresholds 41 and 43 so as to remain in the safe flight domain. In the event of departure from the safety zone, an alarm is raised. Advantageously, the zones 42 and 44 have an inherent colour representing a danger zone so as to make it easier for an operator to read.

Figure 4D:
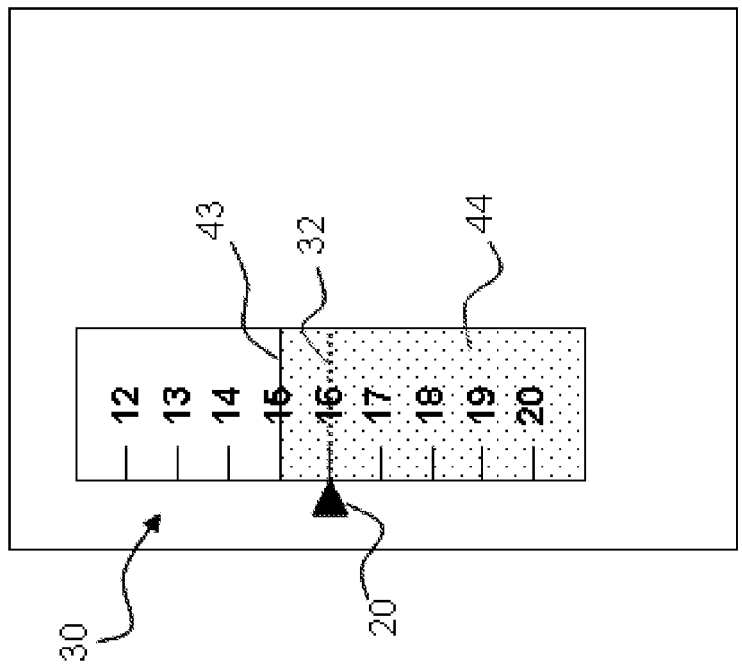
Figure 4C:
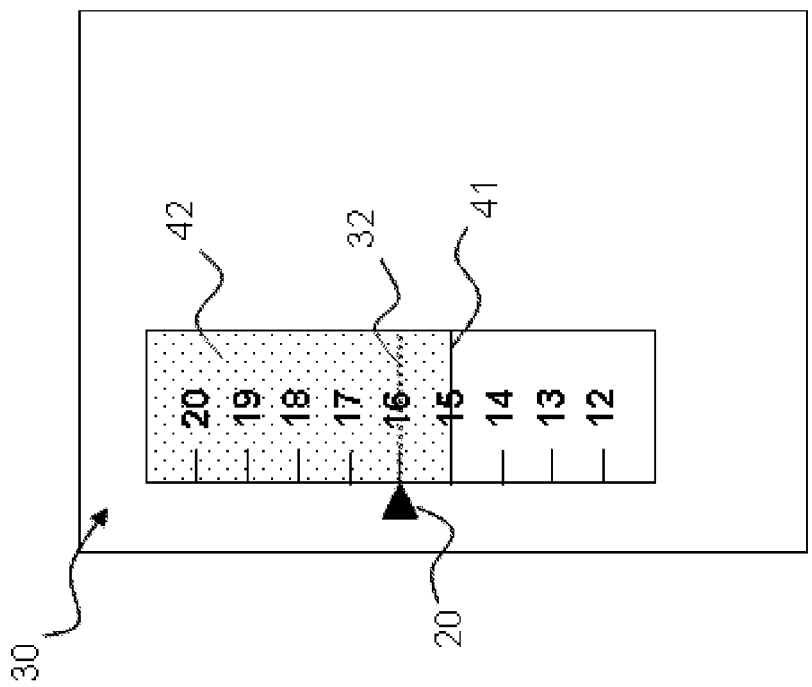

FIGS. 4C and 4D represent two configurations where the cursor representing the vertical speed of the aircraft is in one prohibited zone 42, 44. In these typical cases, an alarm is raised indicating the imminence of a danger.

The configuration of FIG. 4A is:
Absolute vertical speed of the aircraft: 14 m/s upwards
Limit vertical speed of the aircraft upwards: 15 m/s
Absolute vertical speed of the ship: not represented
The limit acceptable relative vertical speed of the aircraft in the ship moving reference frame: not represented
No speed alarm is triggered The configuration of FIG. 4B is:
Absolute vertical speed of the aircraft: 14 m/s downwards
Limit vertical speed of the aircraft downwards: 15 m/s
Absolute vertical speed of the ship: not represented
The limit acceptable relative vertical speed of the aircraft in the ship moving reference frame: not represented
No speed alarm is triggered The configuration of FIG. 4C is:
Absolute vertical speed of the aircraft: 16 m/s upwards
Limit vertical speed of the aircraft upwards: 15 m/s
Absolute vertical speed of the ship: not represented
The limit acceptable relative vertical speed of the aircraft in the ship moving reference frame: not represented
A speed alarm is triggered The configuration of FIG. 4D is:
Absolute vertical speed of the aircraft: 16 m/s downwards
Limit vertical speed of the aircraft downwards: 15 m/s
Absolute vertical speed of the ship: not represented
The limit acceptable relative vertical speed of the aircraft in the ship moving reference frame: not represented
A speed alarm is triggered The invention comprises numerous advantages. Notably the representation of the vertical speeds when landing an aircraft on the deck of a ship in motion may be controlled on the basis of a unique indicator. The indicator comprises various cursors generated and arranged so as to make it easier to analyze and to read sensitive data.

Moreover the invention makes it possible to generate an indicator correlating first speed information and danger zones.

Finally the invention makes it possible to generate alarms when certain limit speeds are crossed.

What is claimed is:

1. A device for checking speed intended for an aircraft ready to land on deck on a moving vehicle, the aircraft having a current vertical speed, called the first speed, the moving vehicle having a vertical speed, called the second speed, a first setpoint being defined, the said setpoint corresponding to the desired limit of vertical downward speed of the aircraft in relation to the vertical speed of the moving vehicle, the device comprising a display and means for receiving data originating from the aircraft, notably its vertical absolute speed, the device comprising a calculator making it possible to generate on the display a graduated speed gauge comprising a first fixed cursor indicating the value of the first speed and a second moving cursor indicating the value of the second speed, a third moving cursor indicating the first setpoint, the graduation being centred around the value of the first speed.

2. The device for checking speed intended for an aircraft ready to land on deck on a moving vehicle according to claim 1, wherein a first zone lying between the second and the third cursor comprises a first noteworthy graphical element allowing an operator to check that the first speed is not situated below the said zone.

3. The device for checking speed intended for an aircraft ready to land on deck on a moving vehicle according to claim 2, wherein the first graphical element is a colour or a pattern.

4. The device for checking speed intended for an aircraft ready to land on deck on a moving vehicle according to claim 3, wherein a second zone situated below the third cursor comprises a second noteworthy graphical element.

5. The device for checking speed intended for an aircraft ready to land on deck on a moving vehicle according to claim 4, wherein the second graphical element is a different colour or pattern from the first graphical element.

6. The device for checking speed intended for an aircraft ready to land on deck on a moving vehicle according to claim 1, wherein a predefined high threshold is generated in the form of a fourth cursor in the gauge corresponding to a maximum limit speed of the aircraft.

7. The device for checking speed intended for an aircraft ready to land on deck on a moving vehicle according to claim 6, wherein a zone is situated beyond the fourth cursor and that it comprises a third noteworthy graphical element indicating a danger zone.

8. The device for checking speed intended for an aircraft ready to land on deck on a moving vehicle according to claim 7, wherein the third graphical element is a colour or a pattern.

9. The device for checking speed intended for an aircraft ready to land on deck on a moving vehicle according to claim 1, wherein a predefined low threshold is generated in the form of a fifth cursor in the gauge corresponding to a minimum limit speed of the aircraft.

10. The device for checking speed intended for an aircraft ready to land on deck on a moving vehicle according to claim 9, wherein a zone is situated beyond the fifth cursor and that it comprises a third noteworthy graphical element indicating a danger zone.

11. The device for checking speed intended for an aircraft ready to land on deck on a moving vehicle according to claim 10, wherein the third graphical element is a colour or a pattern.

* * * * *